United States Patent
Teran-Matus et al.

(10) Patent No.: US 12,045,684 B2
(45) Date of Patent: Jul. 23, 2024

(54) SYSTEM AND METHOD FOR INFERRING THE PRESENCE OF OBJECTS BY MEANS OF IDENTIFICATION AND DETECTION

(71) Applicant: OHEL TECHNOLOGIES, LLC., Austin, TX (US)

(72) Inventors: José-Adalberto Teran-Matus, Austin, TX (US); Hector Gomez-MacFarland, Austin, TX (US)

(73) Assignee: OHEL TECHNOLOGIES, LLC., Austin, TX (US)

( * ) Notice: Subject to any disclaimer, the term of this patent is extended or adjusted under 35 U.S.C. 154(b) by 0 days.

(21) Appl. No.: 18/079,382

(22) Filed: Dec. 12, 2022

(65) Prior Publication Data

US 2024/0193380 A1 Jun. 13, 2024

(51) Int. Cl.
*G06K 7/10* (2006.01)

(52) U.S. Cl.
CPC ................ *G06K 7/10128* (2013.01)

(58) Field of Classification Search
CPC ................................... G06K 7/10128
See application file for complete search history.

(56) References Cited

U.S. PATENT DOCUMENTS

| | | | |
|---|---|---|---|
| 7,932,824 B2 | 4/2011 | Flores et al. | |
| 8,358,212 B2 | 1/2013 | Blair | |
| 2010/0090809 A1* | 4/2010 | Yeo | G06K 19/0717 340/10.41 |
| 2015/0379860 A1 | 12/2015 | Vardi | |

FOREIGN PATENT DOCUMENTS

| | | |
|---|---|---|
| AU | 2016200113 | 8/2016 |
| DE | 10 2010 029 996 | 8/2021 |

* cited by examiner

*Primary Examiner* — Jamara A Franklin
(74) *Attorney, Agent, or Firm* — NIXON & VANDERHYE

(57) ABSTRACT

A system and method for inferring the presence of objects including the identification of an object at least one time and use other presence sensor(s) to confirm the tag or sensor is still in the area of interest even if the identification cannot be confirmed.

20 Claims, 3 Drawing Sheets

SYSTEM AND METHOD FOR INFERRING THE PRESENCE OF OBJECTS BY MEANS OF IDENTIFICATION AND DETECTION

BACKGROUND OF THE INVENTION

A. Field of the Invention

The present invention is related to electronic systems and methods for tracking objects inside an area of interest and more particularly to a system and method for inferring the presence of objects comprising the identification (id) of an object for least one time and use other presence sensor(s) to confirm the tag or sensor is still in the area of interest even if the identification cannot be confirmed.

B. Description of the Related Art

In the current revolution for smart factory, internet of things, industrial revolution 4.0, there is an important need to identify and locate tools, machines, equipment and other relevant items. To fulfill this need, a transponder, tag, chip, image, sensor or other mean for automated identification is attached to the object of interest, however there are some challenges when the precise and continuous location of an object is needed as the successful reading of the identification may fail due different circumstances like not being in the area of reading, not being aligned, having certain kind of interference or other different reasons, making it unreliable to assure that the object is in the expected location is the same object tracked when the identification cannot be read.

For example, U.S. Pat. No. 7,932,824, discloses an item tracking system which makes use RFID technology for automatically monitoring the taking and returning operations of items from one or more storage locations inside a working area which allows to have an "on line" status of each tool as well as the using history of each tool, furthermore, the system "knows" which item has been taken or stored from which storage area by which worker and when and synchronize and compile the information of all storage locations in one database and system for administering, reporting and sending alarms in order to have total tool control, accountability, tools service control (maintenance, calibration, repairs, and/or replacement), and administration of usage for the tools controlled by the system. However, sometimes, items move a little and the RFID reader stops reading the RFID tag and indicates that the object was removed although in reality the object is still there, only that the RFID tag is not aligned with the reader and may register collision or absence or misreading. Therefore it would be desirable to still track each item even if the identification information cannot be read. The prior art already describes methods and systems for locating and tracking objects, such as those described in the following documents:

Patent No. AU2016200113B2 describes various embodiments of a wirelessly detectable object to be used in medical procedures are provided. One example wirelessly detectable object includes a radio frequency identification (RFID) transponder that, when interrogated, wirelessly returns a first response signal that contains identification information associated with a surgical object. The wirelessly detectable object further includes a presence transponder that, when interrogated, wirelessly returns a second response signal that does not contain identification information. The presence transponder is received and freely movable within a pouch. The presence transponder is independently movable with respect to the RFID transponder. Another example wirelessly detectable object includes at least one active antenna element and at least one passive antenna element that together operate as a directional antenna.

Patent No. DE102010029996B4 describes a radio frequency identification communication system, RFID communication system, for inventory monitoring of a flow warehouse, comprising: at least one first and one second stationary RFID antenna (5, 6) for sending and receiving data; an RFID transponder (2) attached to an object or a group of objects (1), wherein the RFID transponder (2) electronically stores at least one identifier of the object or the group of objects (1), and wherein the first RFID antenna (5) is placed at an input area and the second RFID antenna (6) is placed at an output area of a storage section of the flow storage facility in order to detect the object or the group of objects (1) using the identifier of the RFID transponder (2) capture; and at least one first and one second presence sensor (13, 14) to detect the presence of an object or a group of objects (1) in the input and/or output area of the storage line. Presence sensors only determine whether an object with or without an RFID transponder is within their range.

U.S. Pat. No. 8,358,212B2 describes an integral detection and identification system for detecting and identifying an object includes an identification transponder and a presence/absence transponder. The identification transponder includes a first inductive winding wound about a core and electrically coupled to an integrated circuit to transmit an identification signal in response to receipt of an interrogation signal in a first frequency range. The identification signal encodes an identifier stored by the integrated circuit. The presence/absence transponder includes a resonant inductive/capacitive tank circuit having at least a second inductive winding wound about a core and electrically coupled to a capacitor to transmit a presence/absence signal in response to an interrogation signal in a second frequency range. The presence/absence response signal lacks unique identifying information and is physically coupled to the identification transponder to form an integral detection and identification transponder that can selectively be attached to the object. Since the integral detection and identification transponder is attached to the object, the presence/absence signal also conveys that the object is present.

Patent application No. US20150379860A1 describes a system for tracking movement of assets or persons includes a presence sensor coupled to an RFID exciter or transmitter. Upon detection of object presence by a sensor, the exciter is turned on and caused to transmit an RFID tag exciting signal. The signal may be received by and activate a corresponding RFID tag that is within range of the exciter. The RFID tag may then transmit its ID, the ID of the exciter, and the sensed presence information to a remote RF receiver and back-end data processing system.

Although the prior art documents described above describe systems and methods using detection and identification means to track objects, none explicitly describe that the identification information and the detection signal are related, such that, if obtaining the identification information fails, and detection has been successful on a continuous basis, the detection signal is assumed to belong to that object.

Since the methods and systems above described may be unreliable, applicant developed a system and method comprising getting the identification (id) of an object for least one time and use other presence sensor(s) to confirm the tag or sensor is still in the area of interest even if the identification cannot be confirmed. If the identification of the object is not successful and presence detection has been successful on a continuous basis, then the method assumes that the object detected is the same as the one previously identified (where continuous is defined as successful and constant identification of the presence of the trackable object every N times, N being defined as necessary but a reasonably small time span to reasonably assume that it is the same object).

None of the described prior art documents describe the successful continuity of detection of an object as: "successful and constant identification of the presence of the trackable object every N times, N being defined as necessary but a reasonably small time span to reasonably assume that it is the same object".

The system and method of the present invention allows a precise and continuous location of an object, which assures that the object that is in the expected location is the same object tracked when the identification cannot be read.

SUMMARY OF THE INVENTION

It is therefore a main object of the present invention, to provide a system and method for tracking objects by means of identification and detection which comprises the identification (id) of an object for least one time and use other presence sensor(s) to confirm the tag or sensor is still in the area of interest even if the identification cannot be confirmed.

It is another main object of the present invention, to provide a systema and method of the above referred nature in which If the identification of the object is not successful and presence detection has been successful on a continuous basis, then the method assumes that the object detected is the same as the one previously identified (where continuous is defined as successful and constant identification of the presence of the trackable object every N times, N being defined as necessary but a reasonably small time span to reasonably assume that it is the same object).

It is another object of the present invention to provide a system and method of the above referred nature, which allows a precise and continuous location of an object, which assures that the object that is in the expected location is the same object tracked when the identification cannot be read.

These and other objects and advantages of the systema and method for tracking objects by means of identification and detection of the present invention will become apparent to those persons having an ordinary skill in the art, from the following detailed description of the embodiments of the invention.

DETAILED DESCRIPTION OF THE INVENTION

Figure 1:
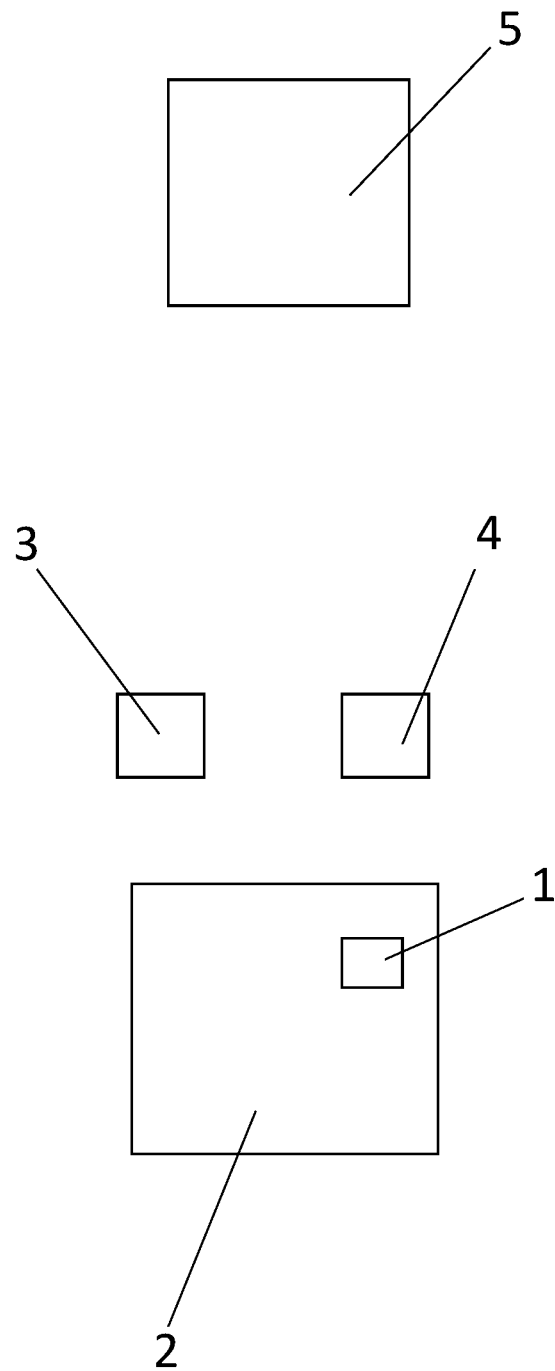
FIG. 1 is a diagram of the components of the system of the present invention in its most general embodiment.
Figure 2:
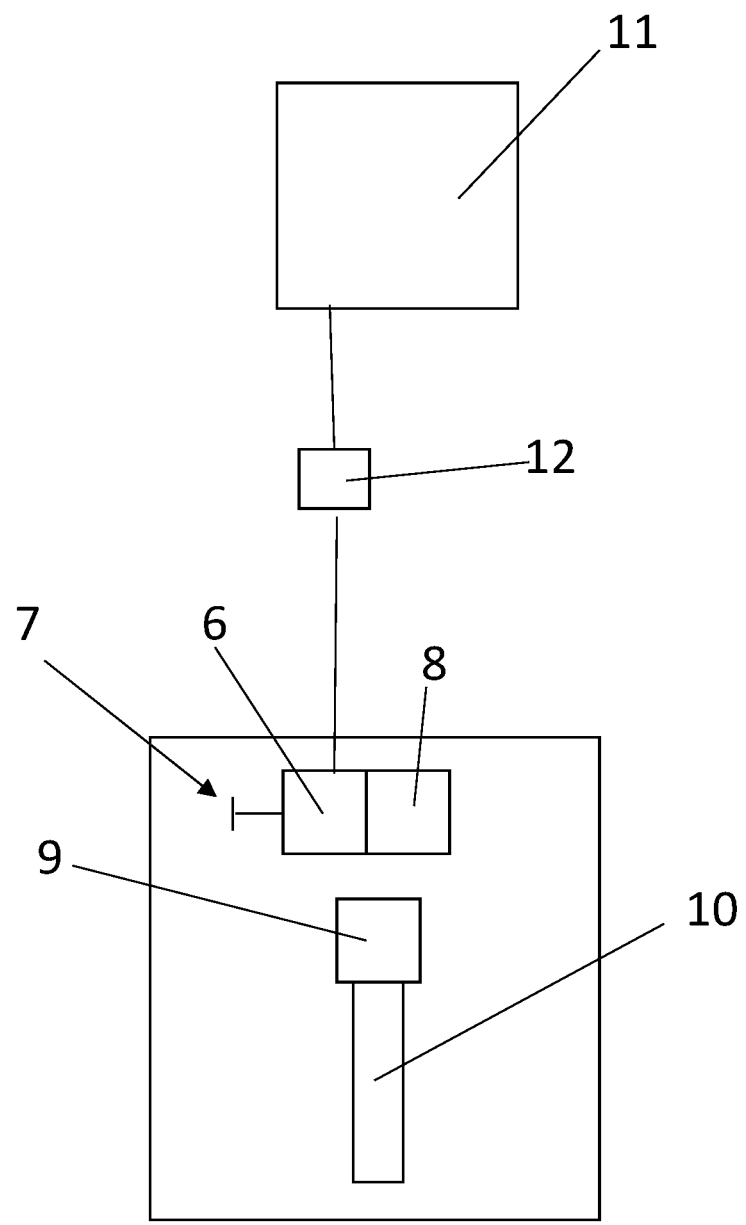
FIG. 2 is a diagram of the components of a first embodiment of the system of the present invention.
Figure 3:
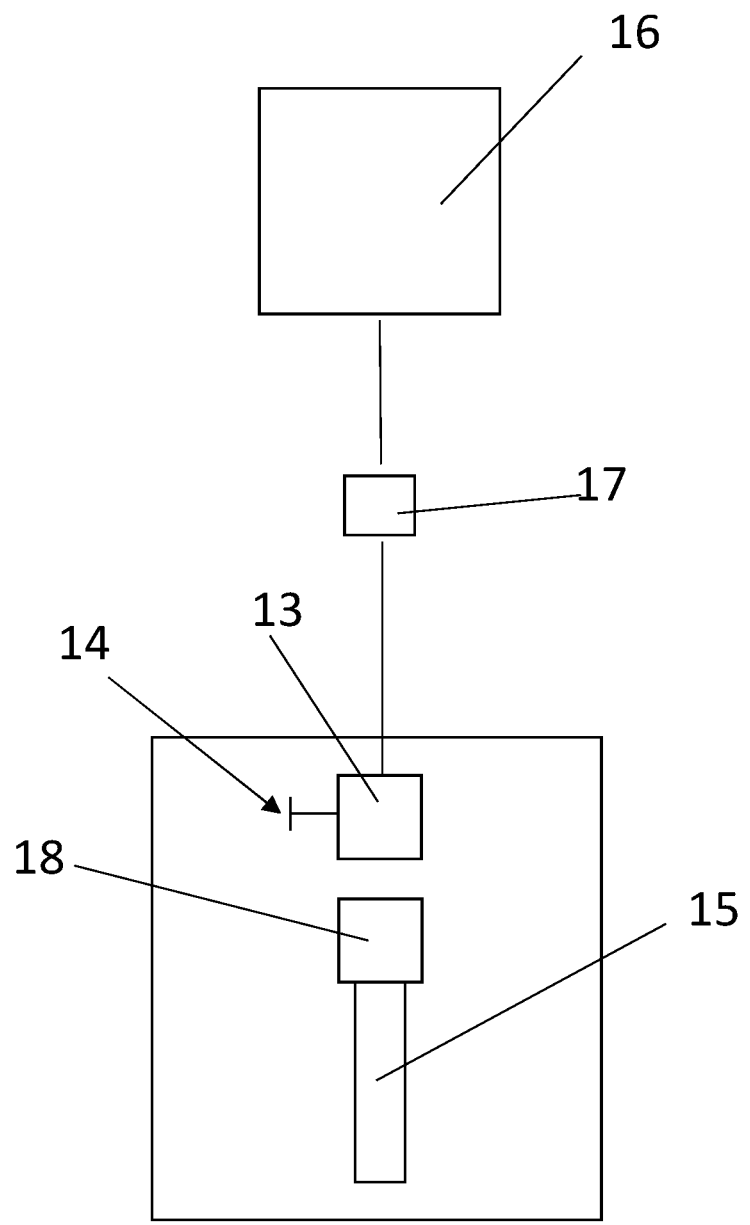
FIG. 3 is a diagram of the components of a second embodiment of the system of the present invention.

The method for tracking objects by means of identification and detection of the present invention is based on an electronic tracking system. In a most general embodiment, said electronic tracking system comprises the following elements:

one or more readable identification means such as an RFID Tag. (1), each attached to an object (2) to be tracked and each object assigned to a scanning area, said identification means having identification information about the object, such as a number ID.

one or more means for wirelessly obtaining information (readers) (3) from a readable identification means such as by radio signal, image, sound, magnetism, Bluetooth, or any other mean of automated identification, each reader assigned to a scanning area and obtaining information from one correspondent readable identification means attached to an object assigned to said scanning area;

means for detecting the presence or absence of an object (presence sensors) (4) using methods based on but not limited to magnetism, electromagnetic, optic, radiofrequency, image, video, heat, Bluetooth, or any other method for presence detection, each presence sensor assigned to a scanning area and obtaining presence information from one correspondent object, and wherein the presence sensors may be configured to sense any kind of material such as metal and wood;

data processing means (computer) (5) connected to each reader and to each presence sensor, either by wire or wirelessly;

wherein each reader (3) obtains identification information such as an ID number from a correspondent readable identification means (1) when receiving a request from the computer (5) and send said information thereof in order to be processed;

wherein each presence sensor (4) senses the presence of a corresponding object (2) inside the predetermined scanning area when receiving a request from the computer (5) and sends the presence information to the computer in order to be processed. The presence information may comprises a Boolean value: true "1" when the presence sensors (4) detect an object (2) and false "0" otherwise or any other information representative of a positive presence information or a negative presence information.

wherein when both, identification information and presence information from a specific object (2) is received by the computer (5), it is processed according to the method described below, in order to determine whether the object is present or not.

A first embodiment of the electronic tracking system comprises the following components:

one or more radio receivers (RFID readers) (6) each having an antenna (7);

one or more metal presence sensors (presence sensors) (8) each one creating an inductive field, which is altered in the presence of metal. Wherein the presence sensor (8) measures the disturbances in the inductive field which is indicative of the presence of metal at a predetermined distance;

wherein the number of RFID readers (6) and presence sensors (8) is the same and each RFID reader (6) and presence sensor (8) form a pair (reader/presence sensor) that is assigned to scan a predetermined scanning area different from other pairs of readers (6) and presence sensors (8);

one or more transponders (tag RFID) (9), each one attached to a respective object (10) to be tracked, and each object (10) assigned to a specific scanning area;

a computer (11) connected to the one or more RFID readers (6) and to the one or more presence sensors (8) by means of a HUB (12) operating for example, with 12C protocol, but not limited to such protocol;

wherein each RFID reader (6) interrogates a transponder attached to an object (10) assigned to the correspondent scanning area for obtaining identification information such as an ID number corresponding to an object (10) being tracked inside the assigned area when receiving a request from the computer (11) and sends said information to the computer (11) in order to be processed;

wherein each presence sensor (8) of a pair of reader/presence sensor senses the presence of an object (10) inside the assigned scanning area when receiving a request from the computer (11) and sends the presence information to the computer (11) in order to be processed.

A second embodiment of the electronic tracking system comprises the following elements:

one or more radio receivers (RFID readers) (13), each having an antenna (14);

means for detecting the presence or absence of an object to be tracked inside a predetermined area (presence sensor), wherein each presence sensor comprising the same antenna (14) of each RFID reader (13), which senses the presence of an object (15) by the distortion of the object (16) in the electromagnetic field, wherein each RFID reader (13) being assigned to scan a predetermined area different from other RFID readers (13);

a computer (16) connected to the one or more RFID readers (13) by means of a HUB (17) operating, for example with a 12C protocol, but not limited to said protocol;

one or more transponders (tag RFID) (18), each one attached to a respective object (15) to be tracked, and each object (15) assigned to a specific scanning area;

wherein each RFID reader (13) interrogates a correspondent tag RFID (18) of an object (15) assigned to the scanning area in order to get identification information such as an ID number from said tag RFID (18) when receiving a request from the computer (16) and sends said information to the computer (16) in order to be processed;

wherein each RFID reader (13) is continuously sensing the presence of the object (15) assigned to the scanning area, by means of the antenna (14) which senses the signal of the electromagnetic field affected by the object (15) (inductive sensor) when receiving a request from the computer (16) and sends said information to the computer (16) in order to be processed.

wherein when both, identification information and presence information from a specific object (15) is received by the computer (16), it is processed according to the method described below, in order to determine whether the object is present or not.

In all embodiments, the RFID reader can report codes according to the reading status, an example of protocol can be the following:

If it detects presence of an RFID tag it reports the Tag ID;
If it does not find an RFID reader, it reports a specific code, e.g. 024.
If it finds an RFID tag and cannot read it due to an error, it reports a specific code, e.g. 042;
If it encounters a rfid tag and cannot read it because of a collision it reports a specific code, for example a 045;

In the present invention, if the RFID reader can read at least once the tag ID, thereafter, as long as the presence sensor continues to detect that the object is still present, the reader will report the Tag ID regardless of the read status it detects.

In all embodiments, the time it takes for the computer to obtain the information from all the readable identification means and the corresponding presence information and process it to determine whether the object is present or not (i.e. the time between each complete scanning operation) obviously depends on the number of objects to be scanned (each object assigned to a scanning area) and the equivalent number of pairs of means for wirelessly obtaining information/presence sensors comprising the system.

For a system that must monitor fifty objects or areas to be scanned and has fifty pairs of readers/presence sensors the time it takes for the computer to perform a complete scan operation is between 10 to 40 milliseconds.

Therefore, for such a system, the minimum time between complete scanning operations should be in the range of 10 to 40 milliseconds and in any case, less than one second if it is suspected that the objects will be moving continuously. However, in other embodiments the periodicity at which the operations are performed may be greater than one second in case the object to be tracked does not move so often, for example, one movement every second and a half.

The time between each complete scanning operation, in any case, must be so often that it is not possible to physically change the object without the presence sensor detecting the change. For example, if we are in a scenario where no one can change the object in less than 10 minutes then the time range between each complete scanning operation may be programmed to be a maximum of 10 minutes.

Also, it must be understood that each interrogating/detecting operation is continuously performed by each pair of means for wirelessly obtaining information from the one or more readable identification means and presence sensor at the same time.

Although in the above-described embodiments it was described that the presence sensors use the signal of the electromagnetic field to detect metal, it may comprise any kind of known or to be known method or presence sensor for detecting the presence of any kind of material. Examples of presence sensors that may be used are: magnetic, inductive, optical and ultrasonic.

As previously disclosed, the method of the present invention is based on the above described tracking system.

The present invention also comprises a method that combines two strategies: identification, including but not limited to radio signal, image, sound, magnetism, Bluetooth, or any other mean of automated identification, and presence detection including but not limited to magnetic, electromagnetic, optic, radiofrequency, image, video, heat, Bluetooth, or any other mean for presence detection. The present invention applies the identification strategy comprising identifying the uniqueness of the object being tracked and detecting its continuous presence as a form of tracking and validation that is the same object even if the identification cannot be confirmed due to different circumstances. The identification method continuously reads the identification of the tracked object, while the presence sensor continuously detects the presence of the tracked object. Once the identification of the object is read for at least one time, and the presence sensors detects the presence of the tracked object, the readings from both methods are linked, therefore, if the readers cannot successfully read the identification from the tracked object due different circumstances like not being in the area of reading, not being aligned, having certain kind of interference or other different reasons, but the presence sensor has continuously succeeded detecting (defining continuously by a successful and constantly detecting the presence of the trackable object every N times, being N defined as needed, but comprising a reasonably small lapse of time to assume it is the same object) then the method can assume that the object detected by the presence sensor is the same detected by the readers.

The method of the present invention comprises a series of instructions stored in the memory of the computer and are processed thereof.

In the most general embodiment, the method of the present invention comprises the following steps, wherein the steps are completely performed by the computer, and wherein the method is carried out for each pair of readers/presence sensors corresponding to each scanning area:
  a) sending a signal to activate a reader assigned to a storage area;
  b) sending a signal to activate a correspondent presence sensor assigned to the same storage area;
  c) wirelessly obtaining identification information from the readable identification means of an object present in the scanning area using the reader;
  d) at the same time as step c) is performed (or in other embodiments after step c) is carried out), obtaining presence information about the object, using the means for detecting the presence or absence of an object, said presence information comprising a positive presence information or a negative presence information;
  e) if the computer is able to successfully obtain the identification information from the readable identification means of the object, then a report is generated indicating that the object is present in the scanning area and the presence status of the object is established as: detected;
  f) if the computer is not able to successfully obtain the identification information from the identification means of the object, and the computer is also not able to successfully receive presence information indicating the presence of the object, then a report is generated indicating that the object is not present in the scanning area and the presence status of the object is established as: not detected;
  g) if the computer is not able to successfully obtain the identification information from the readable identification means of the object, and the computer is able to successfully receive positive presence information, then: if the presence status comprises detected, which comprises the presence status of a previous iteration of the method, then a report is generated indicating that the object is present in the scanning area and the presence status of the object is established as: detected;
  h) immediately, repeat steps a) to g) for each scanning area until all areas have been scanned;
  i) Repeat steps a) to h) until the computer receives an external instruction to stop the execution of the method.

The ideal application for the system and method of the present invention is to monitor the presence or absence of objects in small spaces, as is the case with the device and method of U.S. Pat. No. 7,932,824 described above. In said device and method there is a need to monitor the presence of one or more tools, each assigned to a specific location or "pocket".

For this application, the system and method of the present invention would comprise an RFID reader and a presence sensor assigned to each pocket and linked with a specific tool, each tool having an RFID chip that includes tool identification information. As each RFID reader and each presence sensor is linked with a specific tool, there is assurance that the presence information generated by each presence sensor belongs to the linked tool. The logical linkage between each pair of RFID sensors/presence sensors with a specific tool is done by recording the identification codes of each pair of RFID sensors/presence sensors and the identification information of each tool and linking them into a single record in a database or memory means.

In this way, each RFID reader and each presence sensor of each pocket is continuously monitoring (depending on the programmed periodicity, preferably in real time) each of the corresponding pockets, i.e., interrogating the RFID chip of the corresponding tool and obtaining its identification information and continuously detecting the presence of the tool.

According to the method of the present invention, in case the RFID sensor of a specific pocket are respectively able to obtain the identification information of its tool, then the computer will generate a signal or report indicating that the tool is present in the respective pocket.

In the event that at a given time, the RFID sensor and the presence sensor of a specific pocket cannot obtain the identification information and the positive presence information of its tool respectively, then the computer will generate a signal or report indicating that the tool is not present in the respective pocket.

Finally, in the event that at any given time, the RFID sensor is unable to obtain its tool identification information and the presence sensor is able to obtain positive presence information of its tool, then if the last previous information that the presence sensor obtained (before obtaining the current presence information) was a positive presence information, then the computer will generate a signal or report indicating that the tool is not present in the respective pocket.

As indicated above, all stages of the method are repeated for each RFID reader/presence sensor pair until the computer receives an instruction to stop the execution of the method.

Similarly, as described above, the minimum time it takes for the computer to repeat the method for each RFID reader/presence sensor pair depends on the number of tools to be scanned and thus on the corresponding number of RFID reader/presence sensor pairs.

Therefore, to monitor a cabinet that has fifty tools, each assigned to a specific pocket, it is necessary for the system to have fifty pairs of RFID readers/presence sensors, one for each pocket. As described above, it would take the computer from 10 to 40 milliseconds to repeat the method for the fifty pairs of RFID readers/presence sensors of a hub. Consequently, for this specific application, the minimum time range that should exist between each complete hub scanning operation should be between 10 to 40 milliseconds considering that the tools are continuously moved.

For other applications the time range between each complete hub scanning operation may be longer, depending on the frequency with which the objects move.

Likewise, in other applications, a reader/presence sensor pair can monitor a group of objects in a specific area, and in this case, the group of objects will be considered as a single object by the system. Going back to the previous example, this may occur when a box or container that has a plurality of tools is to be monitored, so the system will assign a single transponder to the toolbox and a single reader/presence sensor pair to the toolbox or container.

Finally it must be understood that the system and method for inferring the presence of objects by means of identification and detection, of the present invention, is not limited exclusively to the embodiments above described and illustrated and that the persons having ordinary skill in the art can, with the teaching provided by the invention, to make modifications to system and method for inferring the presence of objects by means of identification and detection of present invention, which will clearly be within of the true inventive concept and of the scope of the invention which is claimed in the following claims.

The invention claimed is:

1. A system for inferring the presence of one or more objects based on identification information and presence information from each object, wherein each object is assigned to a specific storage area, said system comprising:
   one or more readable identification means each attached to an object to be tracked and each object assigned to a storage area, said identification means having identification information about the object;
   one or more means for wirelessly obtaining identification information from the readable identification means (readers), each reader assigned to a storage area and obtaining information from one correspondent readable identification means attached to an object;
   means for detecting the presence or absence of an object (presence sensors), each presence sensor assigned to a storage area and obtaining presence information from one correspondent object assigned to said storage area;
   data processing means (computer) connected to each reader and to each presence sensor, said data processing means having one or more databases;
   wherein each storage area has one reader and one presence sensor for obtaining identification information and presence information from one specific object;
   wherein each reader obtains identification information from a correspondent readable identification means when receiving a request from the computer and send said information thereof in order to be processed;
   wherein each presence sensor senses the presence of a corresponding object inside a predetermined storage area when receiving a request from the computer and sends the presence information to the computer in order to be processed;
   wherein when both, identification information and presence information from a specific object is received by the computer, it is processed, in order to determine whether the object is present or not.

2. The system for inferring the presence of one or more objects according to claim 1, wherein the readable identification means comprises an RFID transponder.

3. The system for inferring the presence of one or more objects according to claim 1, wherein the readable identification means includes identification information about the object.

4. The system of claim 3, wherein the identification information about the object is a number ID.

5. The system for inferring the presence of one or more objects according to claim 1, wherein the readers obtain information from a readable identification using a method based on but not limited to radio signal, image, sound, magnetism, Bluetooth, or any other mean of automated identification.

6. The system for inferring the presence of one or more objects according to claim 1, wherein each reader includes a radio receiver each having an antenna.

7. The system for inferring the presence of one or more objects according to claim 1, wherein the presence sensors detect the presence or absence of an object.

8. The system of claim 7, wherein the presence detectors perform detection based on magnetism, electromagnetism, optics, radio frequency, image, video, heat, or Bluetooth.

9. The system for inferring the presence of one or more objects according to claim 1, wherein the presence sensors are configured so as to detect materials.

10. The system of claim 9, wherein the materials that the presence detectors can detect include metal and wood.

11. The system for inferring the presence of one or more objects according to claim 1, wherein the presence sensors comprise metal presence that create an inductive field, which is altered in the presence of metal, and wherein the metal presence sensor measures the disturbances in the inductive field which is indicative of the presence of metal at a predetermined distance.

12. The system for inferring the presence of one or more objects according to claim 1, wherein each reader and each presence sensor is connected to the computer by means of a hub operating with I2C protocol.

13. The system for inferring the presence of one or more objects according to claim 1, wherein each reader and each presence sensor is wirelessly connected to the computer.

14. The system for inferring the presence of one or more objects according to claim 1, wherein each storage area has a reader presence sensor.

15. A method for inferring the presence of one or more objects, said method being processed by computer, the method comprising:
   a) sending a signal to activate a reader assigned to a storage area;
   b) sending a signal to activate a presence sensor assigned to the same storage area;
   c) wirelessly obtaining identification information from a readable identification means of an object stored in the storage area using the reader;
   d) obtaining presence information about the object using the presence sensor;
   e) if the computer is able to successfully obtain the identification information from the readable identification means of the object, then a report is generated indicating that the object is present in the storage area and the presence status of the object is established as: detected;
   f) if the computer is not able to successfully obtain the identification information from the identification means of the object, and the computer is also not able to successfully receive presence information indicating the presence of the object, then a report is generated indicating that the object is not present in the storage area and the presence status of the object is established as: not detected;
   g) if the computer is not able to successfully obtain the identification information from the readable identification means of the object but the computer is able to successfully receive presence information indicating the presence of the object, and if the presence status of the object comprises: detected, which corresponds to the presence status of the object from an immediately previous iteration of the method, then a report is generated indicating that the object is present in the storage area, and the presence status of the object is established as: detected;
   h) repeat steps a) to g) for each storage area;
   i) repeat steps a) to h) until the computer receives an external instruction to stop the execution of the method.

16. The method for inferring the presence of one or more objects according to claim 15, wherein the steps c) and d) are processed at the same time.

17. The method according to claim 15, wherein the readable identification means comprises an RFID transponder.

18. The method according to claim 15, wherein the readable identification means includes identification information about the object.

19. The method according to claim 15, wherein the readers obtain information from a readable identification using a method based on but not limited to radio signal, image, sound, magnetism, Bluetooth, or any other means of automated identification.

20. The method according to claim 15, wherein each reader includes a radio receiver each having an antenna.

* * * * *